US006450394B1

(12) United States Patent
Wollaston et al.

(10) Patent No.: US 6,450,394 B1
(45) Date of Patent: Sep. 17, 2002

(54) FRICTION WELDING METAL COMPONENTS

(75) Inventors: Tim Wollaston; Richard Pedwell; Paul Bush, all of Bristol (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/572,571

(22) Filed: May 17, 2000

Related U.S. Application Data

(62) Division of application No. 09/212,569, filed on Dec. 16, 1998, now Pat. No. 6,328,261, which is a continuation of application No. PCT/GB98/01650, filed on Jun. 22, 1998.

(30) Foreign Application Priority Data

Jun. 20, 1997 (GB) .............................................. 9713209

(51) Int. Cl.[7] .............................................. B23K 20/12
(52) U.S. Cl. .................................. 228/112.1; 156/73.1
(58) Field of Search .......................... 228/112.1, 114.5, 228/119, 189, 234.1, 2.1; 156/73.1; 244/132, 119, 131

(56) References Cited

U.S. PATENT DOCUMENTS

| 3,732,613 A | * | 5/1973 | Steigerwald ............... 29/470.3 |
| 4,122,990 A | * | 10/1978 | Tasaki et al. ............. 228/112.1 |
| 5,309,748 A | * | 5/1994 | Jarrett et al. .................. 72/256 |
| 5,460,317 A | * | 10/1995 | Thomas et al. .......... 228/112.1 |
| 5,611,479 A | * | 3/1997 | Rosen |
| 5,659,956 A | * | 8/1997 | Braginsky et al. ...... 29/898.053 |
| 5,697,651 A | * | 12/1997 | Fernandes ..................... 285/94 |
| 5,713,507 A | | 2/1998 | Holt et al. |
| 5,841,098 A | * | 11/1998 | Gedrat et al. .......... 219/121.63 |
| 5,847,375 A | * | 12/1998 | Matsen et al. .............. 219/635 |
| 5,971,247 A | * | 10/1999 | Gentry |
| 6,051,325 A | * | 4/2000 | Talwar et al. |
| 6,105,902 A | * | 8/2000 | Pettit |
| 6,237,829 B1 | * | 5/2001 | Aota et al. |

FOREIGN PATENT DOCUMENTS

| EP | 0615480 B1 | * 11/1992 | .............. 228/112.1 |
| WO | WO 01/17721 | * 3/2001 | |

OTHER PUBLICATIONS

C.J. Dawes et al, "Friction Stir Process Welds Aluminum Alloys", Mar. 1, 1996, pp. 41–45 Welding Research, vol. 75, No. 3.

* cited by examiner

Primary Examiner—Tom Dunn
Assistant Examiner—Jonathan Johnson
(74) Attorney, Agent, or Firm—Nixon & Vanderhye P.C.

(57) ABSTRACT

A method of forming a structural airframe component for an aircraft and an airframe structural component are provided. The method includes placing at least two components (1, 2) in abutting relationship with each other and joining them together by friction stir butt welding (3), and the structural airframe component comprises a component manufactured according to the method of the invention.

5 Claims, 12 Drawing Sheets

PORT  Fig. 26    Fig. 27  STARBOARD

FRICTION WELDING METAL COMPONENTS

This is a divisional of U.S. Ser. No. 09/212,569 filed Dec. 16, 1998, now U.S. Pat. No. 6,328,261, which is a Continuation of PCT/GB98/01650 filed Jun. 22, 1998 and incorporated herein by reference.

BACKGROUND OF THE INVENTION

1. Field of the Invention

This invention relates to friction welding of metal, in particular aluminium alloy components, and in particular those used in situations where high strength is required such as in structures for aircraft, helicopters, hovercraft, spacecraft, boats and ships.

2. Discussion of Prior Art

Structures and processes of the invention find particular application in aircraft structure, including primary structure, where strength to weight ratio is paramount.

Airframe structural components are inherently complex in their design and subsequent manufacture owing to the large variety of stresses which will be applied to the structure in different phases of aircraft operation, eg static, level flight, climb, descent, take-off and landing or gust conditions. In order to simplify and reduce the number of airframe components it is a well known principle to integrally machine from solid billets such components. In this way the parts counts and therefore the weight, cost and complexity of the finished assembly can be reduced. However limitations upon designs which are achievable currently exist owing to restrictions on manufacturing capabilities, for example in terms of overall billet size combined with the unavailability of welded joints for many primary aircraft structures owing to the well-known fatigue-inducing and crack propagation qualities of welded joints.

An example of current design limitations in aircraft wing manufacture occurs in the available size of upper or lower wing skin panels for construction of a wing box. At present, for large passenger-carrying aircraft such as the Airbus A340 family, certain areas of the wing box require a spliced joint between up to four separate machined panels where a single panel would be desirable. The overall weight and cost of wing skins formed by the panels is increased. Also a single panel to replace the multi-panel assembly would be structurally more efficient. The present limitation on panel size is caused by a limitation on size of the aluminium alloy billet from which the panel is rolled.

A further example of the limitations imposed by present technology occurs in the manufacture of solid aluminium alloy billets from which inner wing spars are formed for large commercial aircraft. Any increase in size of such aircraft, as is presently projected for a future large passenger-carrying aircraft would result in a requirement for a billet larger than it is currently possible to produce. This restriction raises the need for complex bolted joints between components. Such joints will considerably increase the weight and complexity of the structure and will be structurally non-optimum.

Design difficulties can also occur at the intersections between upper and lower wing skins and upper and lower spar flanges respectively in an aircraft wing box. Upper and lower wing skins will be made of different alloys to enable the different structural requirements to be fulfilled. Where these different alloys are joined to the wing spar fatigue cracking can occur owing to the differing material properties of the skin and spar respectively.

Yet further difficulties can occur in achieving an optimum cross sectional shape at acceptable cost for extruded aircraft wing skin stiffeners, for example stringers. Here the additional material required at the ends of the stringers, often called for example "spade ends" or "rib growouts" can dictate the sectional shape for the whole length of the stringer and can necessitate machining off unwanted material for almost the entire length of the stringer, leading to excessively high machining and material scrap costs.

SUMMARY OF THE INVENTION

According to one aspect of the invention there is provided a method of forming a structural airframe component for an aircraft including placing at least two components in abutting relationship with each other and joining them together by friction stir butt welding.

The structural airframe component may comprise an aircraft wing rib and the at least two components may comprise a central web element and a rib foot element and the method may include the steps of joining together the central web element and the rib foot element by partial penetration friction stir butt welding and subsequently machining away material from at least one of the central web element and the rib foot element in the region of the abutment until the weld becomes a full penetration weld.

The method may also include the steps of providing a said rib foot element of L-shape cross section and carrying out the machining away of material at least from the rib foot element to form a rib foot of T-shape cross section.

"Butt welding" as used herein is intended to include the process of welding together at least two components having edges or surfaces in abutment with each other, whether the components are generally co-planar in the region of abutment or not.

The technique of friction stir butt welding is known from European Patent No. 615480B assigned to The Welding Institute the entire contents of which are incorporated herein by reference. The technique involves placing the two said components in abutting relationship with each other, inserting a probe of material harder than the component material into a joint region between the two components and causing relative cyclic movement between the probe and components whereby frictional heat is generated to cause portions of the components in the region of the joint to take up a plasticised condition, removing the probe and allowing the plasticised portions to solidify and join the components together.

The application of this technique to aircraft airframe structure, including primary load bearing structure would not have been foreseen owing to the aforesaid known properties of welds, namely liability to fatigue. Surprisingly however work carried out has revealed that such friction stir butt welds do indeed possess the qualities to make such structures as aforesaid possible.

In order to exclude the possibility of cracks developing in the region of the weld joint, a weld fatigue resistant feature may be applied to a run-out of the weld. Such a feature may comprise a cold worked hole formed through the weld joint in the region of the run-out followed by insertion of a fastener, for example a bolt. Alternatively, or in addition the joined component in the region of the weld run-out may be shot peened or may have a splice strap fastened in position transverse to the direction of the weld joint. Further in the alternative or additionally the material of the welded component in the region of the weld run-out may be thickened. By the various above means one of the primary areas of fatigue of the welded joint may be prevented from behaving in such an adverse manner.

The friction stir butt welding method may be applied to components having a differing, for example tapering, thickness of material to be welded together by inserting the said probe into the joint between the two components to a depth dependent upon the material thickness at the position of probe entry. In this way a weld having a penetration through the material of the component of sufficient depth to provide a prescribed weld penetration along a length of the weld may be achieved.

The method may include providing a two-piece probe having a central portion for penetrating the weld region and a peripheral portion, movable relative thereto for travelling over the weld region along surfaces of the components being joined, the central portion being movable into and out of the peripheral portion during welding. The central portion and peripheral portion may be relatively movable by a threaded connection therebetween or by any other suitable mechanism like a geared connection or a cam means. The central portion and peripheral portion may include sealing means acting therebetween to prevent ingress of softened component material.

During movement along the weld of a said component of varying thickness such as a tapered component the rate of feed of the probe along the joint and rotational speed of the probe may be varied to optimise welding conditions.

The structural airframe component for an aircraft may comprise a skin stiffener and the method may include the step of placing an extrusion in abutting relationship with an extension or width-increasing region for the extrusion and joining the extrusion to the extension region by friction stir butt welding. In this way extension regions such as rib growouts and stringer spade ends and other root end profiles of width larger than the extruded width may be formed on the stiffener without resorting to the formation of an extrusion of the maximum width required and then machining long lengths of it away to leave just short lengths of the extension regions of the extruded width.

According to a second aspect of the invention there is provided a structural airframe component for an aircraft including a friction stir butt welded joint.

The component in the region of the butt welded joint may be double curvature in form. Also, the weld may be of tapering thickness along its length.

The component may comprise at least two skin panels butt welded together. Wing or fuselage skin or skin/stiffener panels of any required size can thus be produced according to the invention. Said skin panels may have a skin stiffener attached thereto along a length of the weld. Such a skin stiffener may comprise a skin stringer in which skin engaging flanges thereof are attached to the skin on either side of the weld.

The component may include a stiffened aircraft wing skin assembly comprising at least two extruded sections each having integrally formed skin-forming and stiffener-forming portions said sections being welded together. Each weld may include a butt strap fastened thereacross and may include a run-out feature as described above.

The component may comprise an aircraft skin and stiffener assembly including a joint between two stiffeners at which the skin is friction stir butt welded together.

The component may comprise an aircraft skin panel having a shaped plug friction stir butt welded into place therein. In this way local additions to or thickening of the skin during skin formation may be avoided.

The component may include a friction stir butt welded joint between two sub-components of differing cross section.

The component may comprise a hybrid billet of aluminium alloy comprising for example 7000 series alloy friction stir butt welded to 2000 series alloy to enable the known properties of these two alloys better to be employed. In general, friction stir butt welding of hybrid billets enables tailoring of thicknesses, material strengths and fatigue resistances as required. The billets may be for example forgings or extrusions according to the circumstances.

Where a friction stir butt welded joint replaces a joint using fasteners, as for example in the manufacture of large aircraft wing spars, there will be a reduction in the number of fasteners used overall, with a consequent reduction in cost and weight. Also the welded joint itself will be structurally more efficient in that it will be stronger than a fastened joint and, we have discovered, have better fatigue characteristics. In addition assembly time for a welded joint can be reduced, owing to elimination of fasteners and joint sealant. Also fuel leakage paths, in a wing, are eliminated.

The component may comprise an aircraft wing rib or spar machined from a said hybrid billet. The hybrid billet may comprise two or more said friction stir butt welded joints positioned on the billet to optimise strength properties for the billet in the particular circumstances required. For example a said spar may include a weld along a neutral axis thereof or may include such welds at or in the region of junctions between a central web and upper and lower booms thereof.

The component may comprise an I-section or J-section stiffener of web height tapering along the length of the stiffener having a friction stir butt welded joint extending along the length of the tapered web.

The component may comprise an aircraft skin panel having at least one first part stiffener formed integral therewith with a further part of the stiffener friction stir butt welded to the first part of the stiffener.

The component may comprise an extruded aircraft skin stiffener including at least one extension region thereof extending the width of the stiffener beyond an extruded width, said at least one extension region being attached to the remainder of the stiffener by a friction stir butt welded joint. The at least one said extension region may comprise at least part of a rib growout or a spade end or other root end profile region of a skin stringer.

the component may comprise an I-section or a J-section skin stiffener having upper and lower booms or flanges separated by a central web and the at least one extension region may be friction stir butt welded to at least one of the upper and lower booms on one or both sides of the web.

BRIEF DESCRIPTION OF THE DRAWINGS

The invention will now be described by way of example only with reference to the accompanying drawings of which.

DETAILED DESCRIPTION OF PREFERRED EMBODIMENTS

Figure 1:
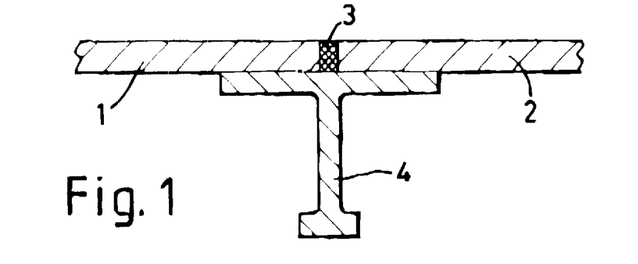
FIG. 1 is a sectional view of a welded stiffened aircraft wing skin panel assembly according to the invention.

FIG. 1 shows skin panels 1, 2 friction stir butt welded together at 3 and having a stringer 4 bolted to the skin panels 1, 2 either side of the weld 3. A secondary load path is thus provided and the need for a butt strap removed.

Figure 2:
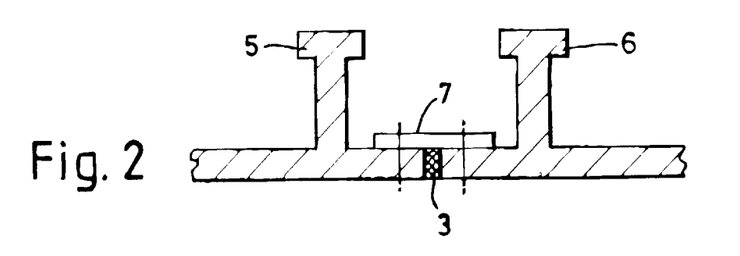
FIG. 2 shows an alternative welded stiffened wing skin panel assembly according to the invention.
Figure 3:
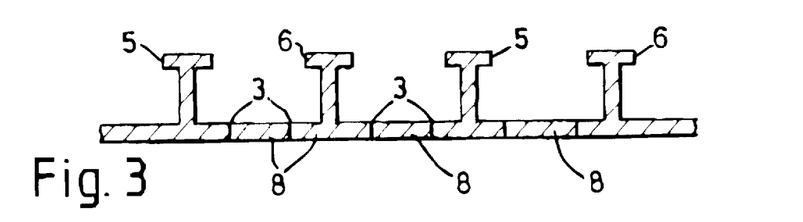
FIG. 3 shows a further alternative welded stiffened wing panel assembly according to the invention.
Figure 4:
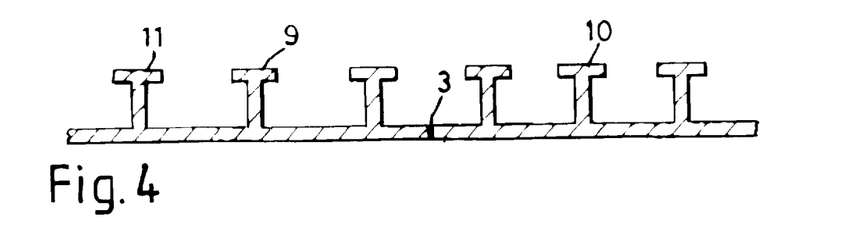
FIG. 4 shows a further alternative welded stiffened wing panel assembly according to the invention, FIGS. 5A, B and C show alternative methods of welding panel stiffening members according to the invention in position.

In FIGS. 2, 3 and 4 alternative structural assemblies for a wing skin or fuselage skin stiffened assembly are shown. Extruded panel stiffener members 5, 6 in FIG. 2 are shown friction stir butt welded together at 3 with a butt strap 7 bolted in position to members 5 and 6 either side of the weld 3. Again by this means it will be seen that a secondary load path is provided.

In FIG. 3 an arrangement similar to that of FIG. 2 includes intermediate skin portions 8 interposed between members 5 and 6 and friction stir butt welded in position with welds 3. Once again members 5, 6 are extruded sections.

In FIG. 4 extruded sections 9, 10 are much wider and each include a number of stiffening portions 11 but are similarly friction stir butt welded at 3.

Figure 5A:
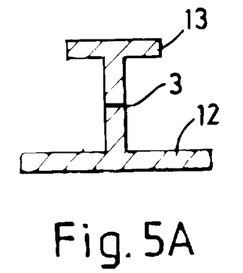
Figure 5B:
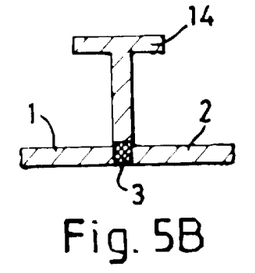
Figure 5C:
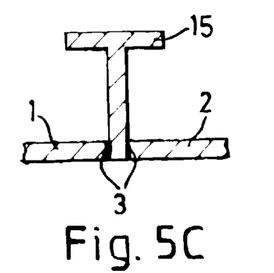

FIG. 5A, B and C show alternative methods of attaching stiffeners to panel members. In FIG. 5A extrusion 12 has a stiffening portion 13, friction stir butt welded to it at 3. In FIG. 5B a friction stir butt weld 3 connects together two panel members 1, 2 and also a T-shaped stiffener member 14. It will be observed that the weld 3 occupies the entire space between members 1, 2 and 14. In FIG. 5C an alternative arrangement to that of FIG. 5B is shown with a T-shaped stiffener 15 extending between panel members 1 and 2.

Figure 6:
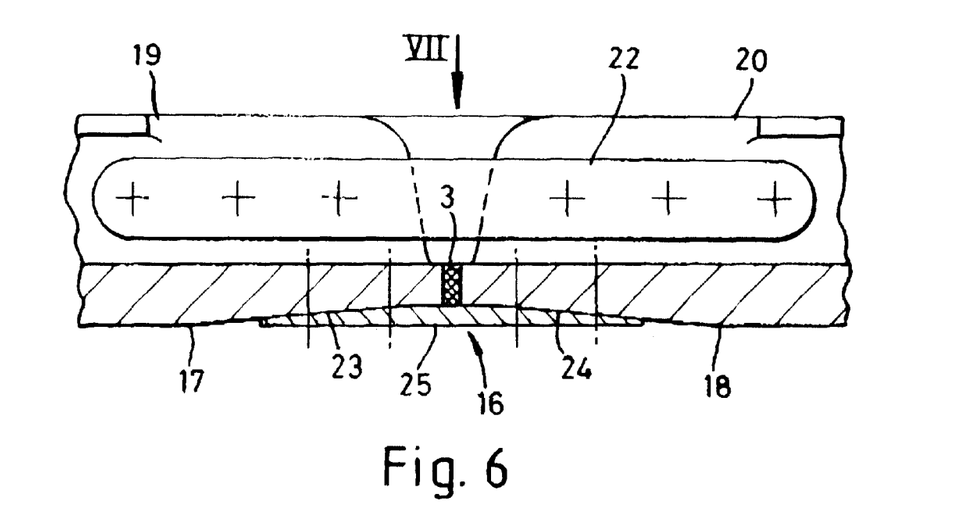
FIG. 6 is a sectional view of a welded stiffened panel assembly according to the invention at a joint between stiffeners and panels.
Figure 7:
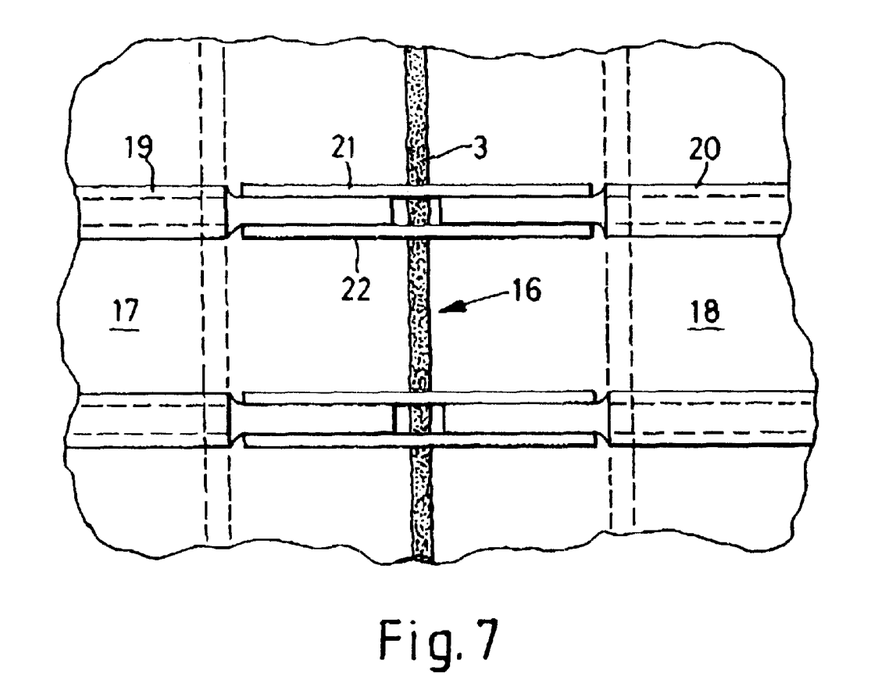
FIG. 7 is a view on the arrow VII of FIG. 6.

FIG. 6 shows a joint region including a joint 16 between two extruded aircraft skin panels 17, 18 and two skin stiffeners 19, 20. Straps 21, 22 extend between stiffeners 19, 20 and are bolted in position. In addition the skin panel members 17, 18 are tapered at 23, 24 to allow the inclusion of a butt strap 25 positioned over a friction stir butt weld 3 and fastened through the panel members 17, 18. Such a joint arrangement is desirable for example at skin stringer run-outs which can be conveniently combined with a joint in the panel members 17, 18. The inherent strength and stability of this joint will be appreciated which takes full advantage of the properties of the friction stir butt weld.

Figure 8:
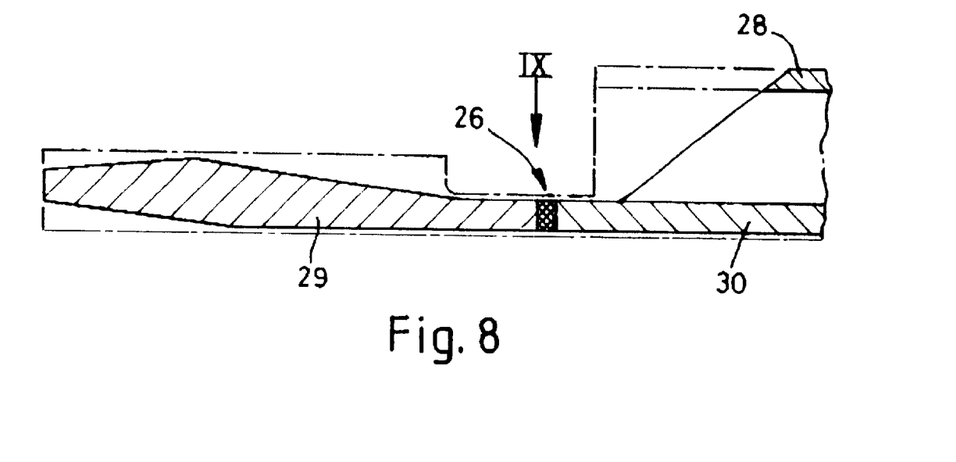
FIG. 8 shows in section a junction between a stringer/panel extruded section and a further panel extruded section according to the invention.
Figure 9:
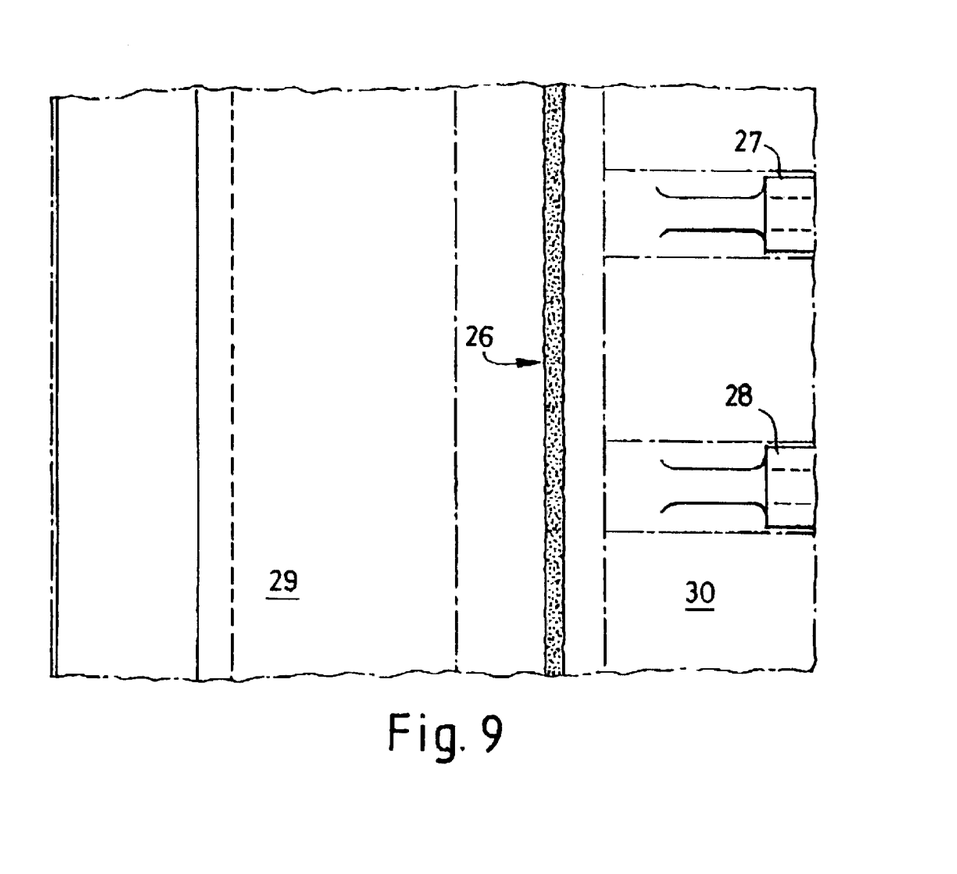
FIG. 9 is a view in the direction IX on FIG. 8.

FIGS. 8 and 9 similarly show a skin panel joint 26 at run-out of a pair of stiffeners 27, 28. The chain dotted line in FIG. 8 shows where material has been machined away. The components comprise extruded sections 29, 30 from which material has been machined as described above. Section 30 is a combined extruded stringer-panel section and section 29 is an extruded panel junction section.

Figure 15:
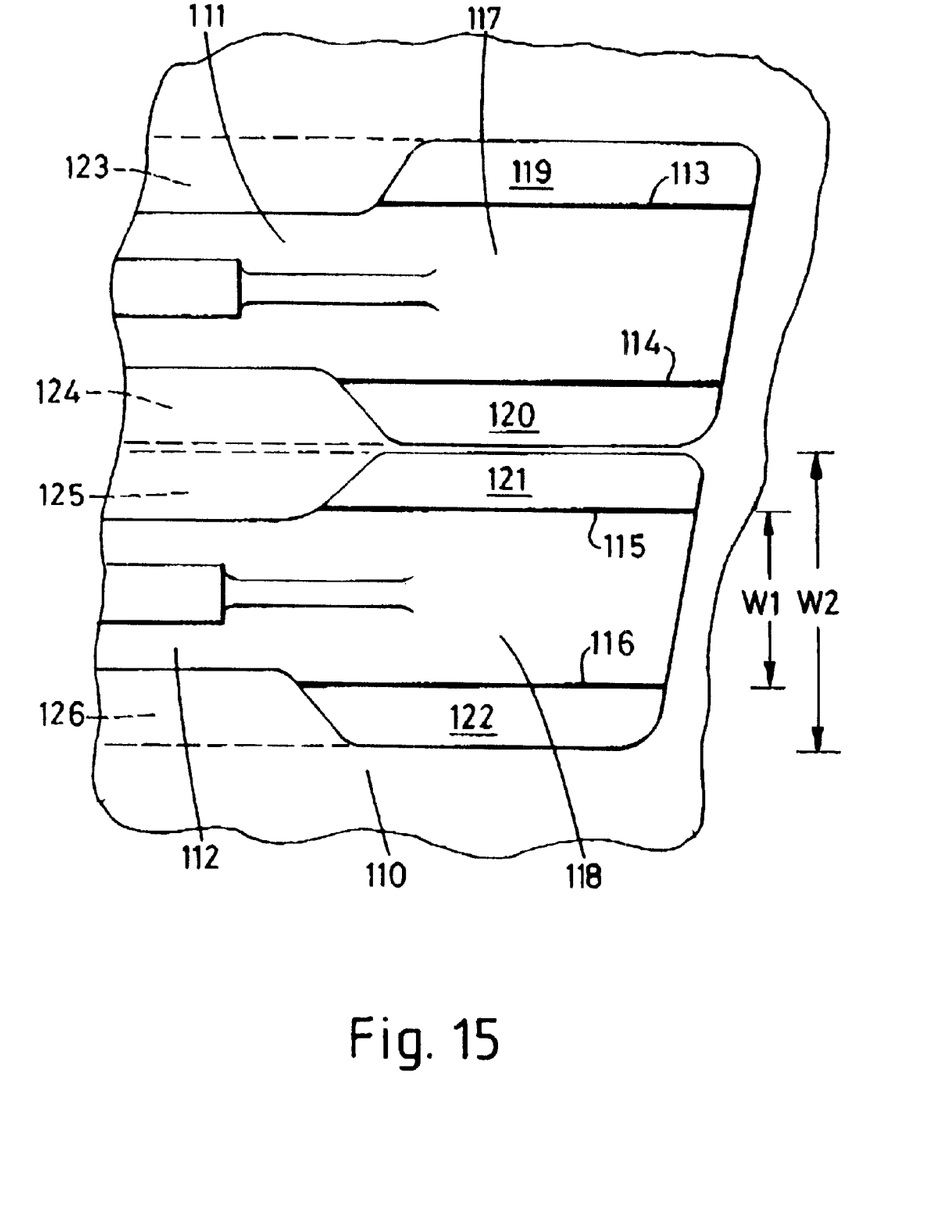
FIG. 15 is a detail plan view of a stiffened aircraft skin panel according to the invention in the region of stringer runouts.
Figure 37:
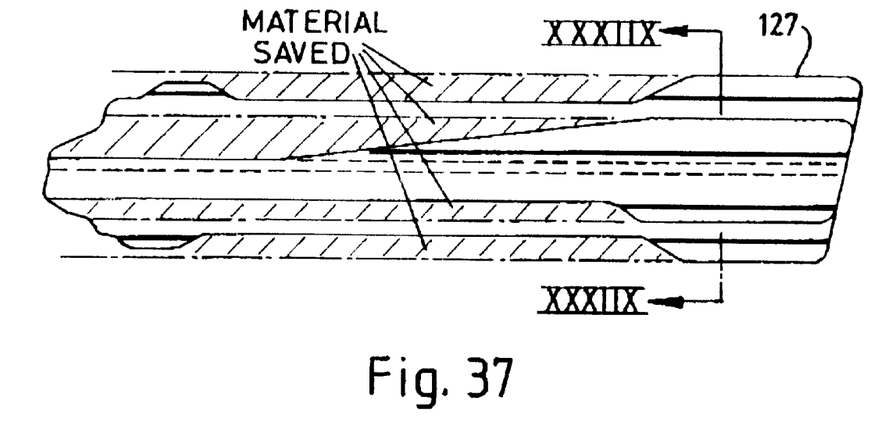
FIG. 37 is a plan view of a typical aircraft wing skin root end stringer manufactured according to the invention.
Figure 38:
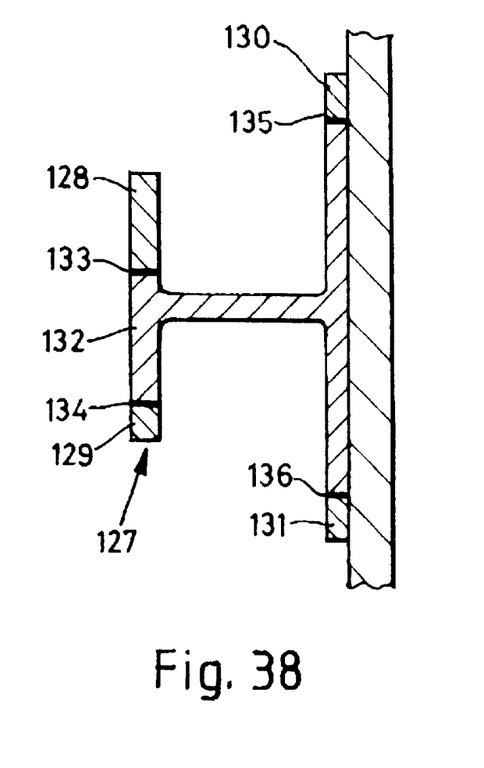
FIG. 38 is a section along the line XXXIIX—XXXIIX of FIG. 37.

In FIGS. 15, 37, 38 tow possible designs of aircraft extruded skin stringer are shown, each employing friction stir butt welded extension regions to widen key parts of the stringer beyond that of the extrusion width. In FIG. 15 a stiffened bottom wing skin 110 is shown, having stringers 111, 112 attached thereto. The stringers each have friction stir welds 113, 114, 115, 116 which form joints between extruded sections 117, 118 and extension regions 119, 120, 121, and 122 respectively. The extruded width W1 of the stringers is seen to be much narrower than the final width W2 and prior art manufacturing methods would have required the stringers to have been extruded to width W2, thus requiring the machining off of scrap regions 123, 124, 125, and 126 for almost the whole length of the stringers, save for the end regions as shown and for any "rib growouts".

FIGS. 37 and 38 show two views of an aircraft wing root end stringer and skin assembly in which a root end profile of the stringer 127 has been extended in a similar manner to stringers 111 and 112 of FIG. 15 by the attachment of extension regions 128, 129, 130 and 131 to an extruded section 132 by friction stir welds 133, 134, 135 and 136. By this means the J-section of the extruded section 132 has been converted to an I-section of the root end profile to provide the added stiffness required in the runout part of the stringer. It will be appreciated that potentially even greater savings of material and machining time can be achieved in this example as both upper and lower booms of the stringer would require machining along almost their entire length according to the prior art.

Figures 10, 11:
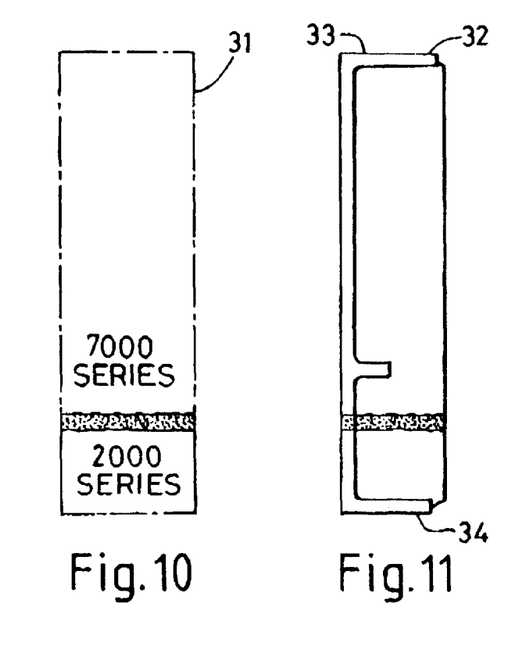
FIG. 10 shows a hybrid billet according to the invention.
FIG. 11 shows an aircraft wing spar machined from the billet shown in FIG. 10.

In FIG. 10 aluminium alloy hybrid billet 31 is shown formed of 7000 series and 2000 series alloy. When machined this billet takes up the form shown in FIG. 11 with the advantages of the different alloy properties being readily apparent to the skilled reader when such a spar 32 extends between upper and lower wing skin panels (not shown) positioned along edges 33, 34 respectively and themselves having different material properties with the upper skin typically being 7000 series aluminium alloy and the lower skin typically being 2000 series aluminium alloy.

Figure 12:
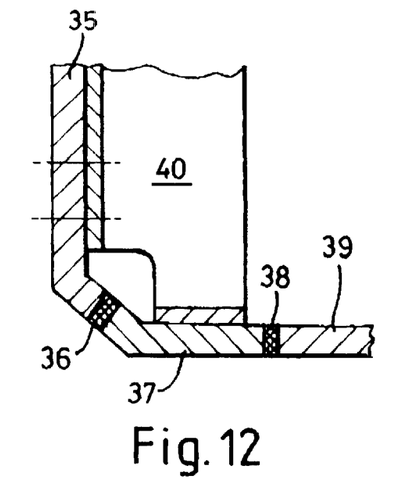
FIG. 12 shows a wing skin-spar assembly welded according to the invention.

In FIG. 12 part of a wing spar 35 is shown friction stir butt welded at 36 to an angled skin portion 37 which is in turn friction stir butt welded at 38 to a skin panel member 39. A separate rib post 40 is fastened in position to spar 35 and angled portion 37. This example teaches how a construction according to the invention works to the designers advantage in designing a complex structural joint assembly. In this example the portion of spar 35 shown comprises 7000 series aluminium alloy, the angled portion 37 comprises 2000 series aluminium alloy and the skin portion 39 comprises 2000 series aluminium alloy.

Figure 13:
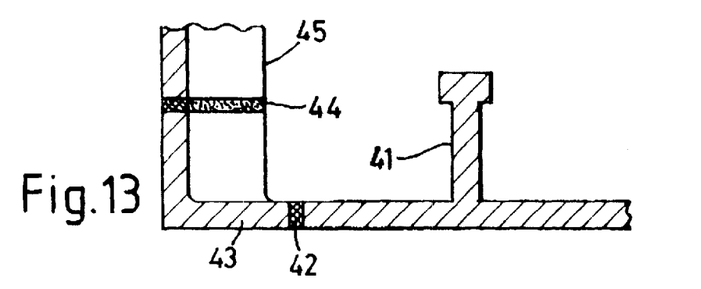
FIG. 13 shows a wing skin-spar assembly as an alternative to that shown in FIG. 12.

In FIG. 13 an extruded skin stiffener portion 41 is friction stir butt welded at 42 to a 2000 series aluminium alloy lower portion 43 of a wing spar. This in turn is friction stir butt welded at 44 to a 7000 series aluminium alloy upper portion 45 of the spar. This arrangement gives various manufacturing advantages without losing strength of the assembly.

Figure 14:
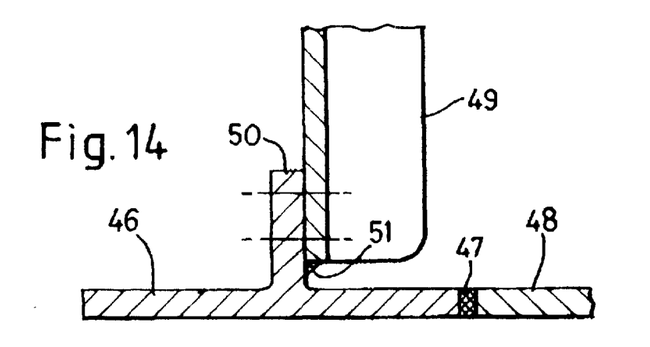
FIG. 14 shows a wing skin-spar-rib post assembly according to the invention.

In FIG. 14 an extruded part stiffened skin member 46 is friction stir butt welded at 47 to a skin panel 48. Skin panel 48 is of 2000 series alloy and the member 46 comprises 7000 series alloy. A rib post 49 is fastened conventionally to stiffening portion 50 of member 46. Sealant is applied at 51.

Figure 16:
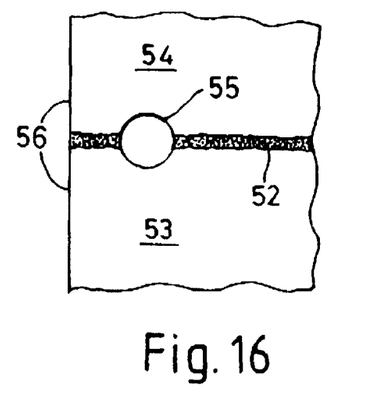
FIG. 16 is a plan view of a friction stir butt weld run-out according to the invention.

In FIG. 16 a run-out area of a friction stir butt weld 52 is shown. The weld 52 extends between two panel members 53, 54. A cold worked hole 55 has been drilled through the weld for insertion of a bolt therethrough. An edge 56 of panels 53, 54 has been shot peened. The overall result of this arrangement is a friction stir butt weld run-out of great safety, having residual stress removed with consequentially improved fatigue life.

Figure 17:
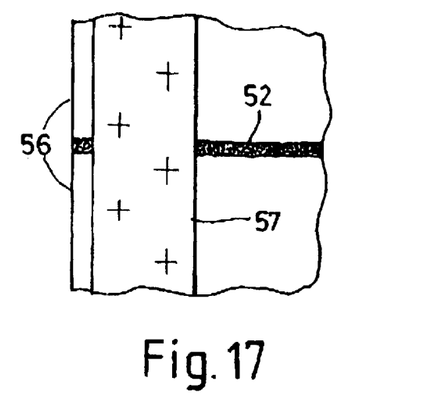
FIG. 17 is a plan view of a alternative friction stir butt weld run-out according to the invention.

FIG. 17 shows a similar arrangement having a splice strap 57 extending across the weld 52. Again edges 56 have been shot peened.

Figure 18:
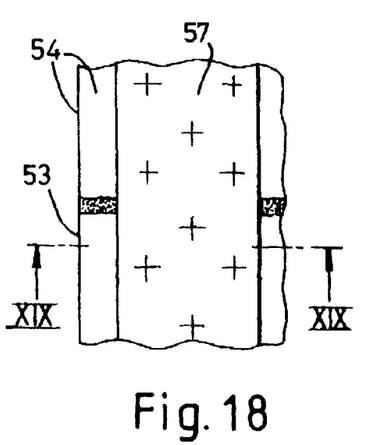
FIG. 18 is a further alternative view of a friction stir butt weld run-out according to the invention.
Figure 19:
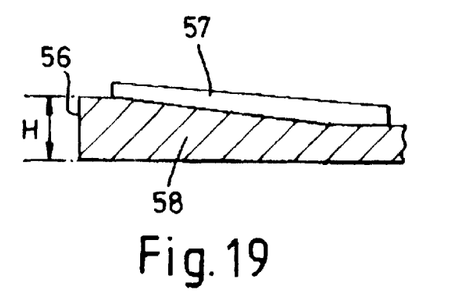
FIG. 19 is a sectional view on the line XIX—XIX of FIG. 18.

In FIGS. 18 and 19 an arrangement similar to that shown in FIG. 17 includes panels 53, 54 being thickened at portion 58 further to increase the strength of the weld at the run-out. In FIG. 19 height H of the panels 53, 54 is shown increased at the edge 56. In addition the splice strap 57 is shown tapered in form.

Figure 20:
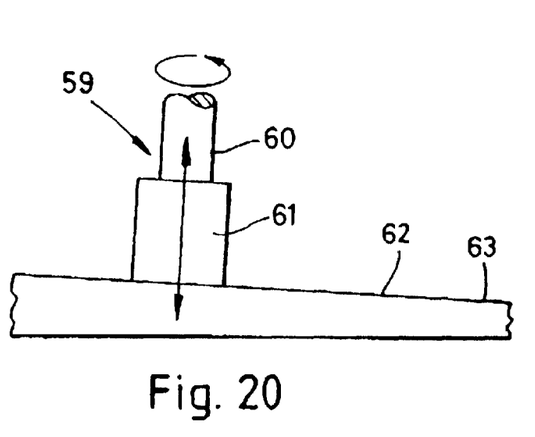
FIG. 20 is a side view of a component and probe according to the invention during the friction stir butt welding process.

FIG. 20 shows an adjustable friction stir butt welding tool 59 having an inner portion 60 and an outer portion 61. The tool is shown traversing between two panels 62, 63 which are tapered in section. It will be observed that the upright rotational axis of the tool 59 is tilted from the vertical to accommodate the taper in the panels. The inner portion 60 of the tool is retractable with respect to the outer portion 61. In this way weld depth can be varied to accommodate taper of the workpiece panels. With this arrangement dynamic tool control of temperature, feed, rotational speed may be monitored and varied for optimum weld joint properties.

Figure 21:
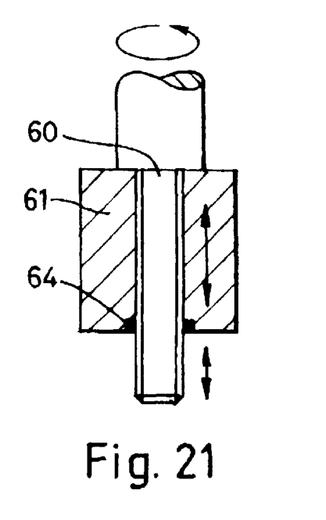
FIG. 21 shows, partly in section, a friction stir butt weld probe according to the invention.

FIG. 21 show the tool 59 of FIG. 20 partly in section and shows how the inner portion 60 is threaded with respect to the outer portion 61. A seal 64 between the inner and outer portion is shown to prevent ingress of workpiece material.

Figure 22:
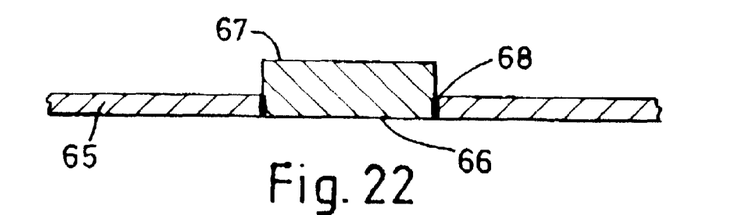
FIG. 22 shows in section a portion of aircraft skin panel with a butt welded plug according to the invention inserted therein.
Figure 23:
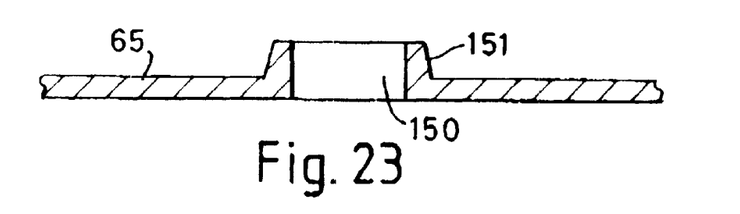
FIG. 23 shows the arrangement of FIG. 22 in subsequent machined condition.

FIGS. 22 and 23 show a skin panel 65, an aperture 66 cut therein and a circular plug 67 friction stir butt welded into position at 68. The finished component as machined is shown in FIG. 23. Here a small amount of excess material has been machined away from a periphery of the plug 67 and a bore 150 has been formed in the plug. By these means a panel may be manufactured in the first instance of much lesser thickness, avoiding the need to machine away large amounts of material from all save the small area 151 surrounding the bore. It will be appreciated that the plug 67, although circular in cross section in this example, may be of any required shape.

Figure 24:
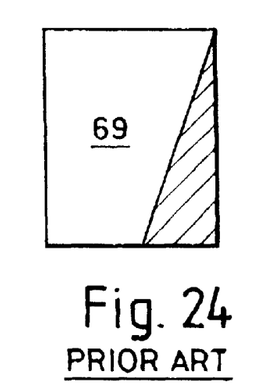
FIG. 24 shows a prior art metal billet.
Figure 25:
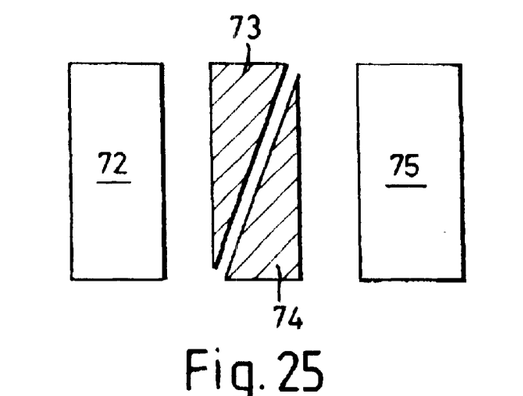
FIG. 25 shows alternative billets according to the invention.
Figure 26:
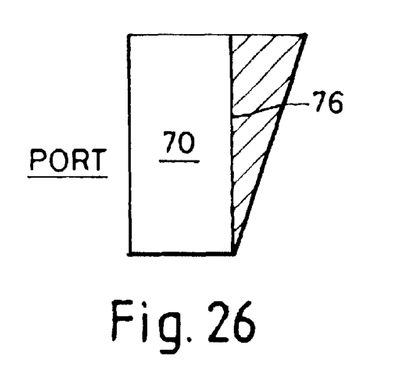
FIG. 26 shows a port wing skin panel according to the invention.
Figure 27:
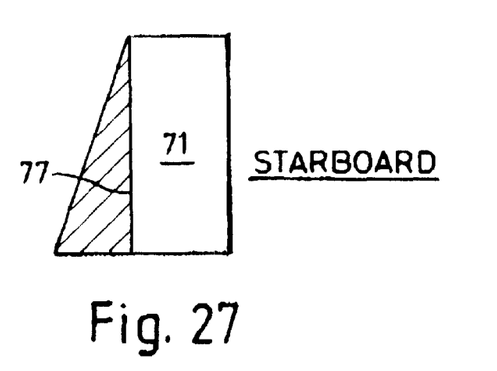
FIG. 27 shows a starboard wing skin panel according to the invention.

In FIG. 24 according to the prior art a billet 69 of aluminium alloy material is shown from which port and starboard wing skin panel sections 70, 71 of FIGS. 26, 27 may be machined. It will be appreciated that the hatched part of the billet of FIG. 24 will be wasted in all cases. Using a method according to the invention however, as shown in FIG. 25 and also in FIGS. 26 and 27, each panel 70, 71 may be made up from billets 72, 73, 74, 75 respectively which are then friction stir butt welded together at 76, 77. In this way port and starboard wing skin panels may be efficiently made and the wasted hatched part of the billet of the prior art eliminated.

Figure 28:
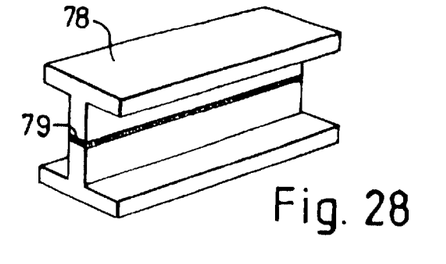
FIG. 28 shows a tapered I-section stiffener having a friction stir butt welded joint according to the invention, FIGS. 29A, B, C, D, E, show alternative aircraft wing spar configurations having friction stir butt welded joints according to the invention in differing locations.

In FIG. 28 is shown a tapered stiffener section 78 having a friction stir butt welded joint 79 centrally thereof. Tapered sections may be more efficiently produced in this way.

Figure 29A:
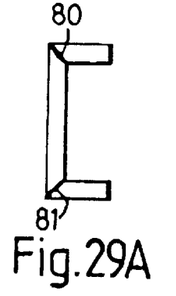
Figure 29B:
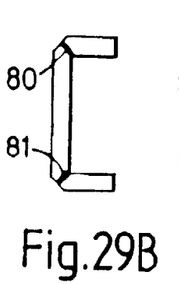
Figures 29C, 29D:
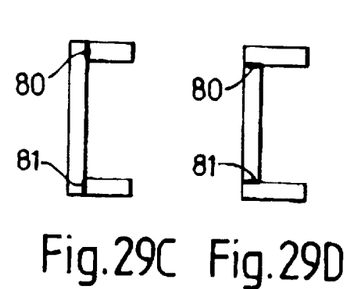
Figure 29E:
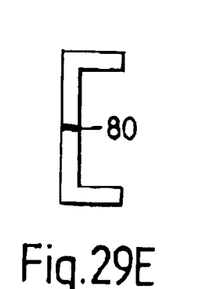

FIGS. 29A, B, C, D and E show alternative aircraft wing spar configurations with friction stir butt welds 80, 81 at various locations thereof in order to optimise strength, manufacturing requirements as necessary. It will be appreciated that each portion of the spar may be of a different material to allow for say better tension properties in a lower portion and better compression qualities in an upper portion.

Figure 30:
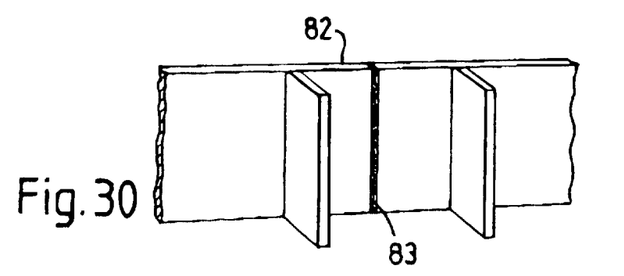
FIG. 30 shows an aircraft wing spar having a vertical friction stir butt weld according to the invention therein.

In FIG. 30 is shown a wing spar 82 having a friction stir butt welded joint 83 vertically disposed thereon for additional strength. This allows the insertion of structurally more optimum sections into highly loaded areas.

Figure 31:
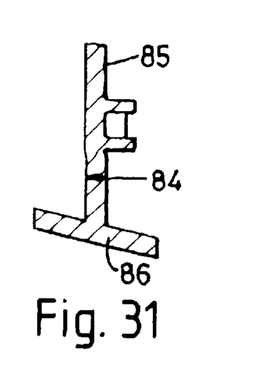
FIG. 31 shows an aircraft wing rib having a foot thereof friction stir butt welded according to the invention to the remainder of the rib.

FIG. 31 shows a wing rib having a friction stir butt weld 84 forming a joint between an upper portion 85 and a lower portion 86 thereof. This construction method obviates the need for machining from a solid billet and affords enormous material savings in comparison thereto.

Figure 32:
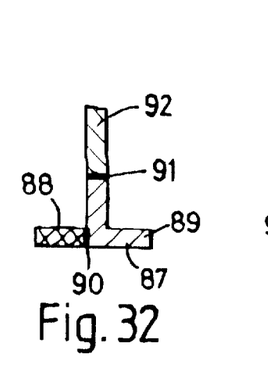
FIG. 32 shows an alternative arrangement to FIG. 31 according to the invention.

FIG. 32 shows an alternative wing rib design with a rib foot 87 manufactured from two parts 88, 89 friction stir butt welded together at 90. An additional friction stir butt weld 91 joins portion 89 with a web portion 92.

Figure 33:
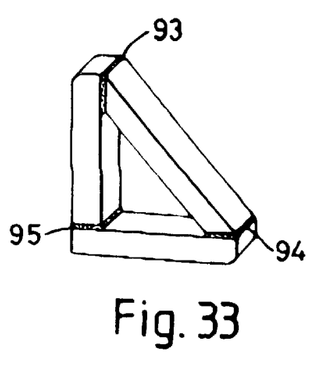
FIG. 33 shows a friction stir butt welded aircraft wing trailing edge rib according to the invention.

In FIG. 33 an aircraft wing trailing edge rib is shown having friction stir butt welds 93, 94, 95 to considerably reduce manufacturing cost and material wastage by avoiding the machining away of large amounts of scrap material from a solid billet.

Figure 34:
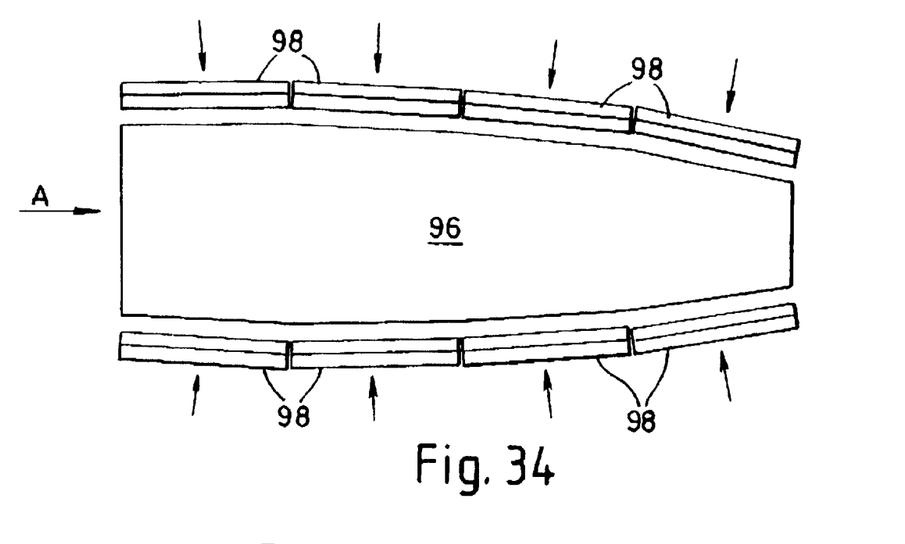
FIG. 34 is an exploded plan view of elements to be used in the manufacture of an aircraft wing rib according to the invention.
Figure 35:
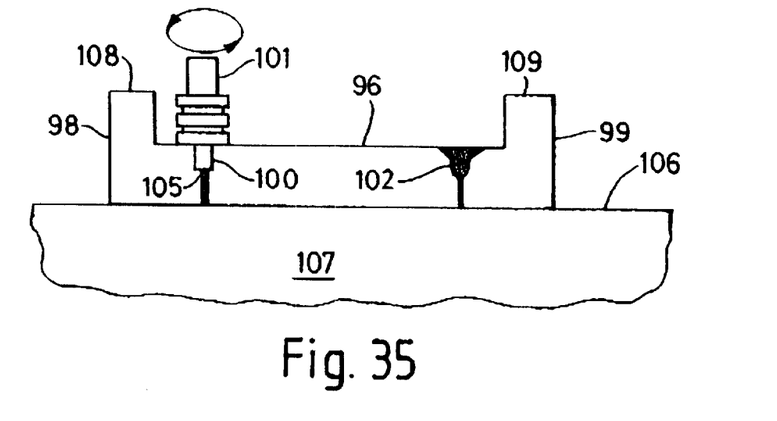
FIG. 35 is a view on the arrow XXXV of FIG. 34, with the elements partially assembled.
Figure 36:
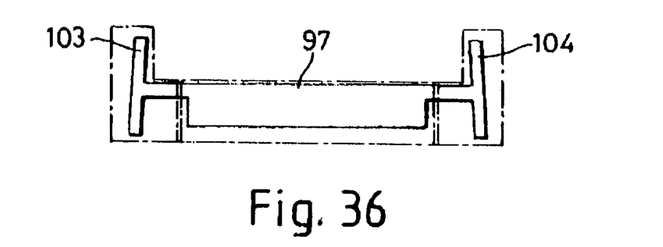
FIG. 36 shows the rib of FIG. 34 friction stir butt welded according to the invention and machined to final shape.

In FIGS. 34, 35 and 36 an aircraft wing rib and method of manufacturing it are shown. In FIGS. 34 and 35 a central billet 96 from which will be machined a stiffening web 97 is shown ready for attachment, by friction stir butt welding, of a series of outer billets 98, 99. In FIG. 35 the elements 96, 98, are shown placed in abutment to each other with a rotating probe 100 of a friction stir welding tool 101 in the process of partial penetration welding them together to form a weld 105. The elements 96 and 99 have already been welded together with a partial depth friction stir weld 102. It will be noted from FIGS. 35 and 36 that, although outer billets 98, 99 are of L-shaped cross section, rib feet 103, 104 are of T-section. Also, although the welds 102 and 105, are formed as partial penetration welds, once the billets 96, 98, 99 have been machined to their final shape shown in FIG. 36, the welds 102, 105 have become full penetration welds. At least two benefits flow from this method of manufacture. Firstly, the tooling (not shown) required for jigging the billets 98, 99 is greatly simplified as compared to that which would be required for jigging parts of the T-shape of the rib feet 103, 104; the billets 98, 99 may be simply held down against the surface 106 of a bed 107 by clamps acting upon top surfaces 108, 109 of the billets 98, 99 respectively, similarly for billet 96. Secondly, the welds 102, 105 may be stronger than otherwise owing to the greater mass of metal of billets 98, 99 acting to conduct heat away faster from the welds 102, 105 and reducing the heat affected zone surrounding the welds 102, 105. It will be appreciated that rib feet 103, 104 would have had to be machined from billets of the shape of billets 98, 99 in any event. In addition dimensional tolerancing of the rib feet 103, 104 may be made easier to achieve owing to all machining being carried out on the rib in its final assembled and welded state.

The L-shaped billets 98, 99 could alternatively be extrusions. In addition, adjoining billets 98 and 99 may be welded to the billet 96 in separate sections or several or all billets 98 or 99 may be joined to each other prior to welding to billet 96. As a further alternative the billets 98, 99 could each comprise a single shaped billet. This could be forged, machined from plate or extruded for example and formed to the desired curvature and friction stir butt welded to the billet 96. A part reduction from 8 pieces to 2 would result.

It will be appreciated that where the use of extruded sections is allowed by constructions of the invention enormous savings in material costs are possible with corresponding savings in assembly costs where component count is reduced. The use of friction stir butt welding in aircraft airframe structures enables the use of extruded sections, for example wing skin-stiffener sections where they have not been possible before, see in particular FIGS. 2, 3, 4.

Figure 39:
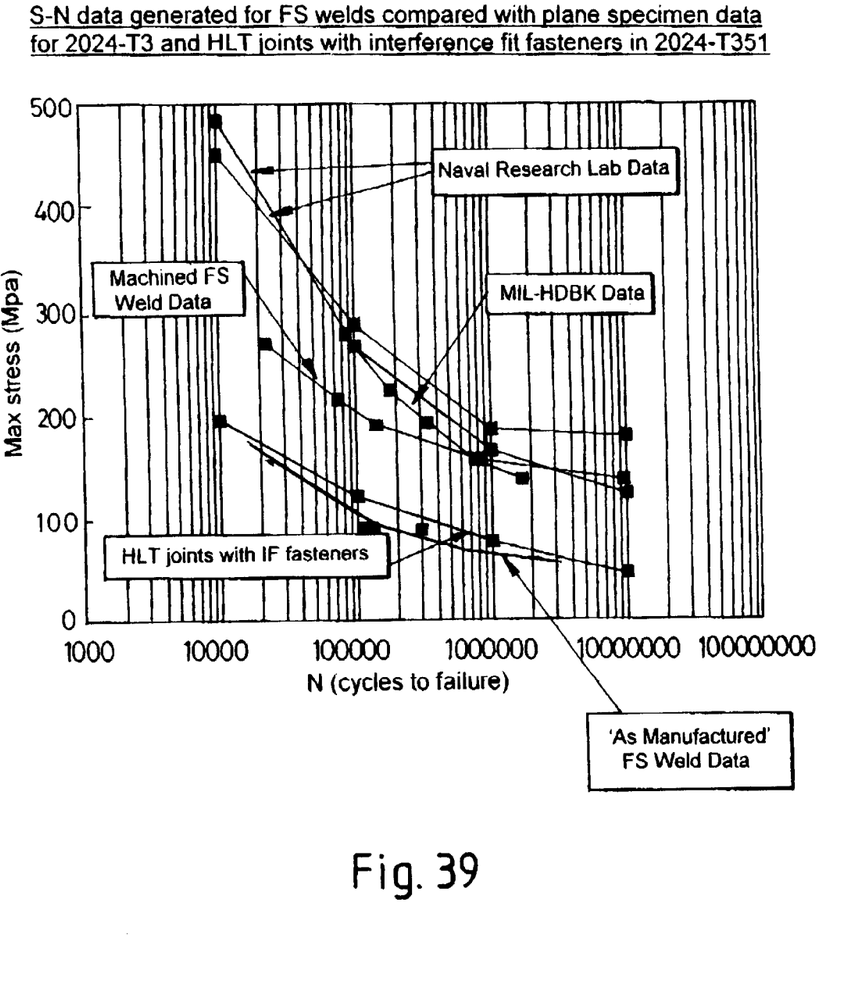
FIG. 39 is a Fatigue Life graph of Maximum Stress plotted against Number of Cycles to Failure for two plain aluminium alloy specimens, for Friction Stir Welded ("FSW") aluminium alloy specimens in both "as manufactured" and machined according to the invention states, and for aluminium alloy specimens with high load transfer joints with interference fit fasteners.

Referring to the graph of FIG. 39, Max. Stress in MPa is plotted against a logarithmic scale of Number of Cycles to Failure for five cases. The three uppermost curves, marked "Naval Research Lab Data" and "MIL-HDBK Data" plot the aforesaid variables for aluminium alloy 2024-T3 plain specimens. These curves show the longest fatigue life for given stress levels up to approximately 7-800,000 cycles, however the curve for the machined FSW specimen crosses two of these plain specimen curves before the maximum measured number of cycles to failure of 10,000,000 to give results superior to them both. The teaching that can reliably be taken from this graph is that clearly the FSW specimen performs extremely well in comparison to the plain specimens and that this performance improves as maximum stress reduces. The curves for the "as manufactured" FSW welded specimin and for the specimen with high load transfer joints with interference fit fasteners perform markedly below those above.

It was observed with very considerable surprise therefore that the specimen with the machined FSW joint performed between 75% and 100+% as well as the tested plain specimens in this standard fatigue test, particularly as the unmachined FSW specimen had performed (as expected) less well than the plain specimens. It should be noted however that the performance of the unmachined FSW specimen closely matched that of the specimen with high load transfer joints with interference fit fasteners and therefore surprisingly proved itself suitable for use in airframe structural components.

Figure 40:
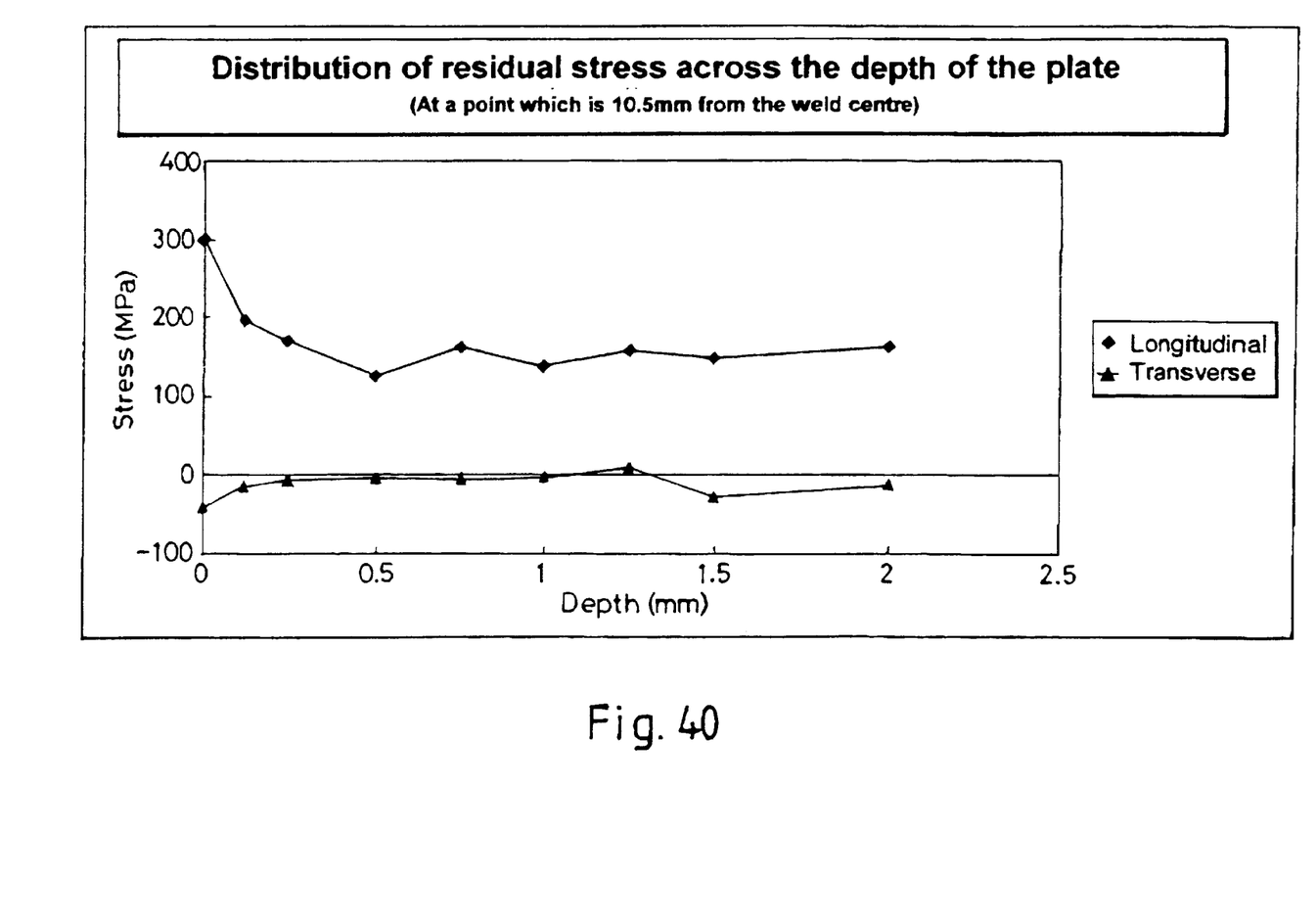
FIG. 40 is a graph of Distribution of Residual Stress across the depth of an aluminium alloy plate Friction Stir Welded, plotting Residual Stress at a distance of 10.5 mm from the weld centre against depth.

Referring to FIG. 40, it has now become clear why the machined FSW specimen performed with such excellence in the fatigue test recorded in FIG. 39. In FIG. 40, which looks at residual stress at different depths from the surface, the peak value of tensile/positive stress occurs in the longitudinal direction and registers approximately 300 MPa. It will be seen that this figure sharply reduces to approximately 200 MPa by the depth of approximately 0.10 mm however, and further again at a depth of approximately 0.25 mm until it reaches its lowest level of approximately 130 MPa at a depth of approximately 0.50 mm. From this depth there is apparently little to be gained from further machining of the surface and the residual stress remains in the region of 140–150 MPa thereafter.

From the foregoing it will thus be clearly appreciated that "as manufactured" or unmachined FSW is, surprisingly, perfectly suitable for use in structural airframe components for aircraft, exhibiting comparable fatigue life to HLT joints with interference fit fasteners, but offering the designer the major potential advantages of lower weight, reduced parts count and assembly time and large savings in machining time and material scrap. However machined FSW offers even greater fatigue life, exhibiting for 2024 aluminium alloy approximately 75% of the fatigue life of plain 2024 material. From work on other aerospace aluminium alloys it is believed that the fatigue lives of these alloys too will be similarly enhanced when FSW is used. This figure is much higher than is obtainable for HLT joints with interference fit fasteners and therefore offers the designer enhanced design scope, both as discussed above and in tailoring billets to specific requirements by the use of FSW joints between different alloy types, when this type of welded structure is used.

What is claimed is:

1. A method of forming a structural airframe component for an aircraft including placing at least two components in abutting relationship with each other and joining them together by friction stir butt welding in which the structural airframe component comprises an aircraft wing rib and the at least two components comprise a central web element and a rib foot element and the method includes the steps of joining together the central web element and the rib foot element by partial penetration friction stir butt welding and subsequently machining away material from at least one of the central web element and the rib foot element in the region of the abutment until the weld becomes a full penetration weld.

2. A method as in claim 1 including the steps of providing a said rib foot element of L-shape cross section and carrying out the machining away of material at least from the rib foot element to form a rib foot of T-shape cross section.

3. A method of forming a structural airframe component for an aircraft including placing at least two components in abutting relationship with each other and joining them together by friction stir butt welding including the step of relieving residual stress in the weld by machining off a surface of the weld to a depth of at least substantially 0.10 mm.

4. A method as in claim 3 in which the said depth is at least substantially 0.25 mm.

5. A method as in claim 3 in which the said depth is at least substantially 0.50 mm.

* * * * *